May 21, 1929.　　　W. E. McLAUGHLIN　　　1,714,389
DIMMING APPARATUS FOR AUTOMOBILES
Filed Aug. 6, 1925　　　3 Sheets-Sheet 1
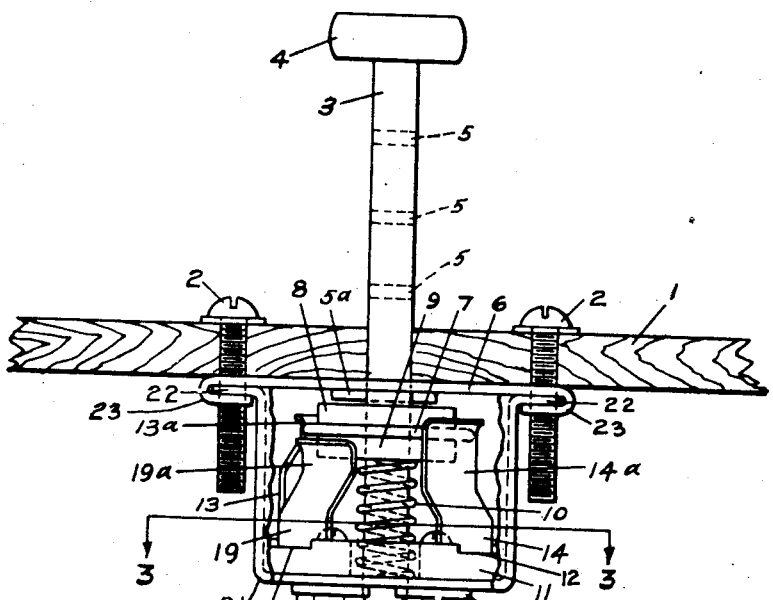
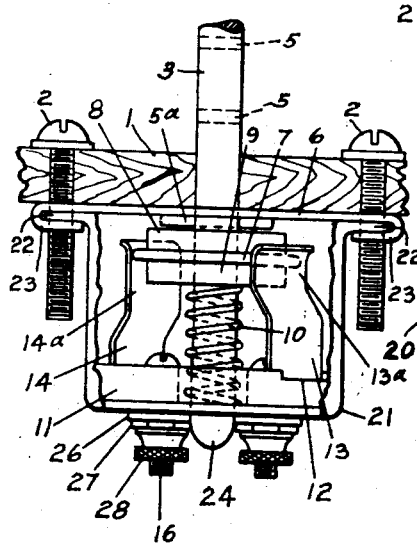
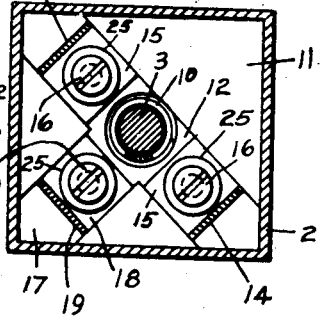
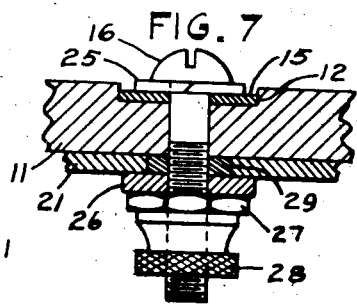
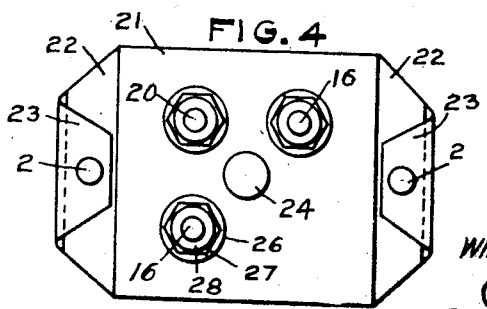
INVENTOR
WILLIAM E. McLAUGHLIN.
BY
ATTORNEYS May 21, 1929.　　W. E. McLAUGHLIN　　1,714,389
DIMMING APPARATUS FOR AUTOMOBILES
Filed Aug. 6, 1925　　3 Sheets-Sheet 2
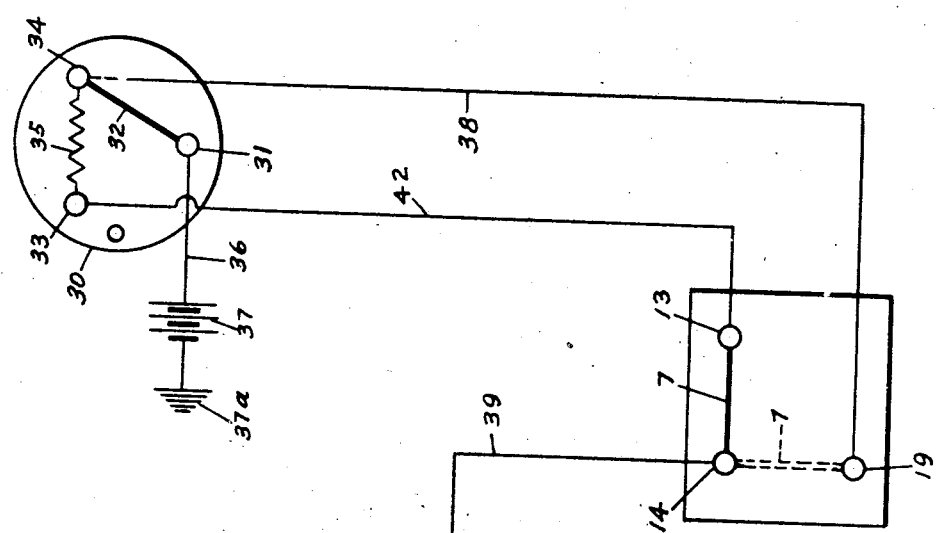
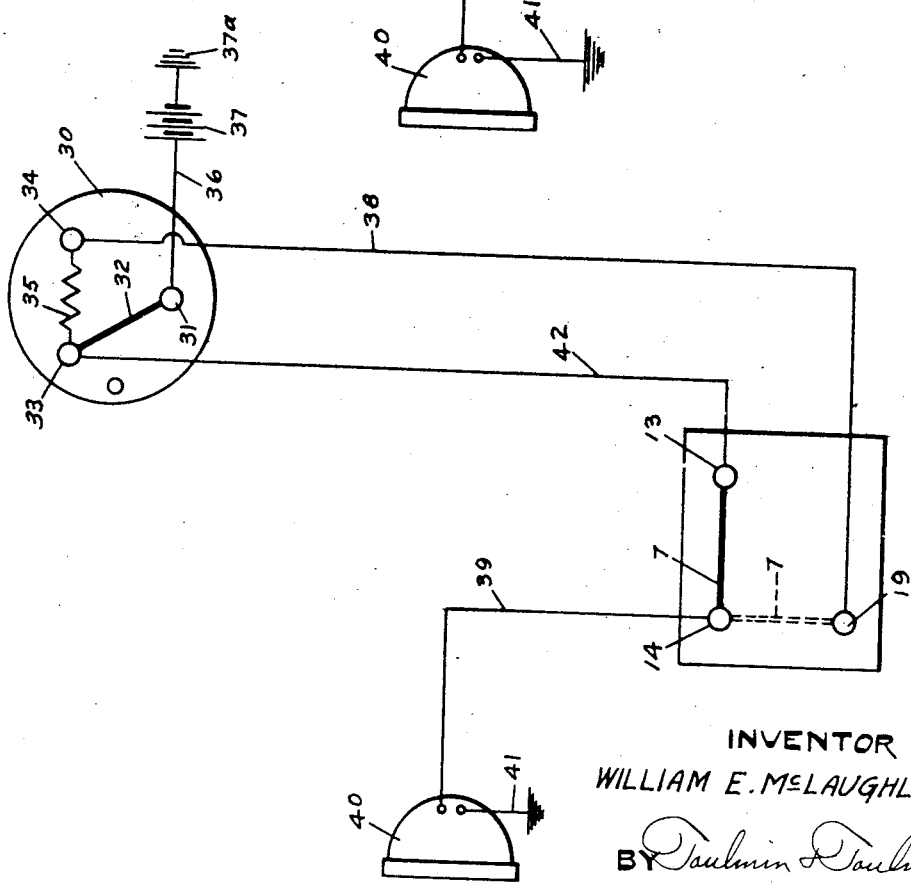
INVENTOR
WILLIAM E. McLAUGHLIN.
BY Toulmin & Toulmin
ATTORNEYS May 21, 1929.  W. E. McLAUGHLIN  1,714,389
DIMMING APPARATUS FOR AUTOMOBILES
Filed Aug. 6, 1925  3 Sheets-Sheet 3
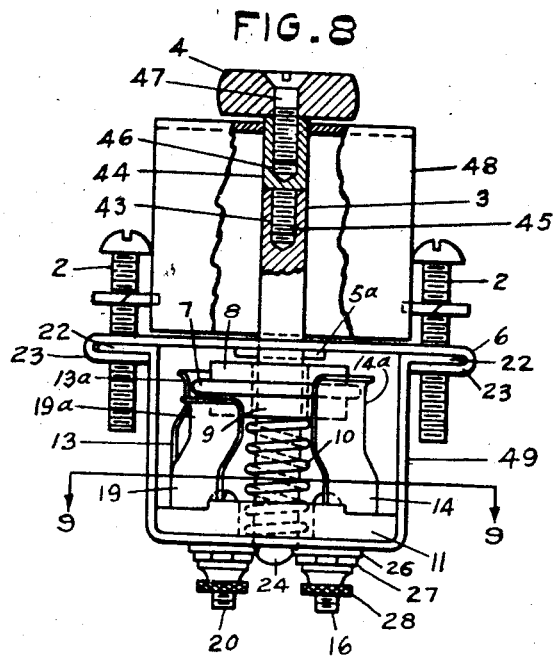
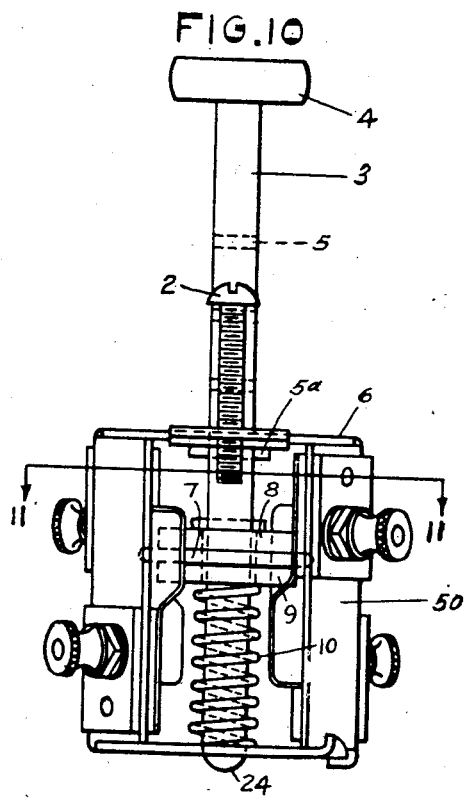
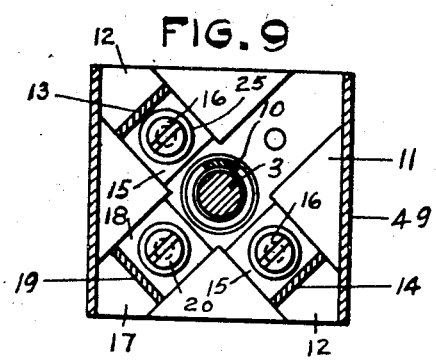
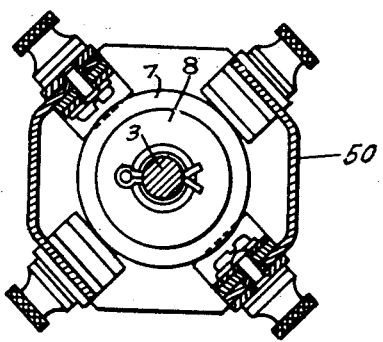
INVENTOR
WILLIAM E. McLAUGHLIN.
BY Toulmin & Toulmin
ATTORNEYS Patented May 21, 1929.

1,714,389

UNITED STATES PATENT OFFICE.

WILLIAM E. McLAUGHLIN, OF MIDDLETOWN, OHIO, ASSIGNOR TO THE BARKELEW ELECTRIC MANUFACTURING CO., OF MIDDLETOWN, OHIO, A CORPORATION OF OHIO.

DIMMING APPARATUS FOR AUTOMOBILES.

Application filed August 6, 1925. Serial No. 48,617.

My invention relates to dimming apparatus for headlights of automobiles.

It is an object of my invention to provide a dimming and brightening apparatus for an automobile which may be applied to the existing electrical system on an automobile so that the dimming or brightening operation may be effected by the foot of the operator.

It is my particular object to arrange the foot-operating mechanism adjacent the left foot of the operator which is only used for operating the clutch pedal and which is therefore relatively idle.

It is a further object of my invention to provide a readily attachable switch mechanism which will be adjustable to different types of cars having different thicknesses of floor boards.

It is another object of my invention to provide a foot operating switch so arranged that it may control the dimming operations in conjunction with the ordinary switch customarily mounted on the dashboard of a vehicle for controlling the lighting system of the vehicle.

It is an additional object to provide a small switch structure which can be easily located on the automobile in the restricted space provided, which is closed to prevent the contacts being rendered useless through the accumulation of dirt, and which can be installed so that it is out of sight save for the operating plunger.

It is an additional object to provide a switch in which there is no cutting off of current and no arcing. It is also an object to arrange the switch so that by removing the pedal button the floor board can be removed.

Referring to the drawings:—

Figure 1 is an elevation of the switch installed in the floor board of a vehicle, which floor board is shown in section. The cover of the switch is broken away to disclose its interior structure;

Figure 2 is a similar view from the other side;

Figure 3 is a section on the line 3—3 of Figure 1, looking in the direction of the arrows, showing the arrangement of the insulating supporting plate with its positioning grooves for the contact fingers;

Figure 4 is a bottom plan view;

Figure 5 is a diagrammatic view of the wiring and switch system in which the parts are so arranged that the head lamps are normally bright and are only dimmed when the switch plunger is depressed;

Figure 6 is a similar view showing the parts in position in which the headlights are normally dim and are only bright upon the depressing of the switch plunger in the switch of my invention;

Figure 7 is a section through the supporting material illustrating the binding post connection;

Figure 8 is an elevation with the cover lifted and partially broken away, of a modified form of the cover arrangement of the switch and modified form of the pedal shaft;

Figure 9 is a section on the line 9—9 of Figure 8;

Figure 10 is another modification of the switch; and

Figure 11 is a section on the line 11—11 of Figure 9.

Referring to the details of these drawings, 1 is a floor board of a vehicle in which the switch is located and to which it is attached at a point preferably near the clutch pedal or to the left hand side of the steering wheel column. The switch is completely located beneath this floor board with the exception of its supporting screws 2 and the operating plunger 3 which is provided with a head 4. This plunger is provided with a series of transverse holes 5 so that the height of the plunger may be adjusted to suit the preference of the user and the thickness of the floor board 1. A transverse cotter pin $5^a$ is located in any one of these holes beneath the top plate 6 of the casing. The cotter pin limits the movement of the contact disk 7 which is a copper washer or ring held between the insulating plates 8 and 9. The lowermost plate 9 engages with the helical spring 10 surrounding the plunger shaft 3. The other end of this spring rests on the hollow plate 11. In the groove 12 there are located two spaced, upwardly extending contact fingers 13 and 14. The finger 13, while of the same height as the finger 14 has a shorter contact area $13^a$ than the longer contact area $14^a$ of the finger 14. The contact area $14^a$ is always in contact with the contact ring 7 while the contact area $13^a$ is only in contact when the plunger is in its uppermost position.

The areas $13^a$ and $19^a$ are in contact with the contact member at the same time so that there is no arc and no dark spot in the lighting system.

The bottom plates 15 of these fingers rest in the groove 12 and as they are rectangular or square and fit neatly within the groove the fingers cannot turn. They are held in position by the bolts 16.

This groove 12 is disposed across the insulating plate 11 from one corner of the plate to the other. At right angles to this groove is a second groove 17 running from the center of the first groove 12 to a third corner. In it is located the base plate 18 of the contact finger 19 which is a shorter contact plate or contact finger than the plates 13 and 14. Its contact area 19ª is engaged by the ring 7 at a time when that ring is in engagement with the contact area 14ª of the contact finger 14. The plate 18 is held in position by the bolt 20. The supporting insulating plate 11 is carried in a cup-shaped casing 21 which has an upper and outwardly extending flange 22 on two walls thereof which flange is embraced by the turned-over sides 23 of the supporting cap plate 6. Through these turned-over sides and outwardly extending flanges the threaded bolts 2 pass, thus serving to support the switch.

It will be noted that the plunger 3 at its lower end 24 passes through the bottom of the casing 21 and through the plate 11.

The contact fingers 13, 14 and 19 are held in position by the bolts 16 and 20 which have beneath them the metal washers 25. These bolts project through the plate 11 and through the bottom of the casing 21 carrying on their lower ends an insulating washer 26, a lock washer 27 and a binding post nut 28 so that wires can be suitably connected to these binding posts. The binding post or bolt 16 or 19 passes through an insulating collar 29 as shown in Figure 7.

Turning to the wiring diagrams, the circuit is as follows as shown in Figure 5, when the lights are normally bright. 30 designates the usual dashboard switch which carries a terminal 31 upon which is pivoted a switch lever 32 which alternately engages with the terminals 33 and 34 between which there is connected a resistance 35 for dimming the lights. The terminal 31 is connected by the wire 36 to a battery 37 which is grounded at 37ª. The terminal 34 is connected by a wire 38 to the contact finger 19. The circuit between the finger 19 and the finger 13 is closed by the switch member 7 when the switch member is depressed. The binding post 14 is connected by the wire 39 to the lamp 40, the other side of the lamp being grounded at 41. The wire 42 connects the binding post 13 to the binding post 33.

It will be observed that if the foot or plunger switch is up and the switch lever 32 is in the position shown in Figure 5, the lights will be normally bright, but dimmed upon the depression of the switch lever. This is due to the fact that the source of current 37 is connected through 36, 31, 32, 33, 42, 13, 7, 14, 39 to the lamp 40 when the switch is up, but when the switch is down, then the current passes from 37, 36, 31, 32, through resistance 35, 34, 38, 19, 7, 14, 39 to the lamp 40.

As will be seen in Figure 6, if the switch lever 32 connects the terminals 31 and 34 then the lights will be normally dim because the current passes through the line 36, 31, 32, 34, 35, 33, 42, 13, 7, 14, 39 to the lamp 40. The lamps will become bright when the switch member 7 is moved to bridge the binding posts or terminals 14 and 19 at which time the circuit will be 36, 31, 32, 34, 38, 19, 7, 14, 39 to the lamp 40.

With reference to Figure 8 it will be observed that the plunger or foot button shaft 3 is so arranged that at its upper end it is internally threaded at 43. This internal threading is adapted to receive a short additional section of the shaft, of which sections there may be any number, this section being designated 44. It carries at one end a projecting threaded member 45 which is threaded into the threaded aperture 43. At its other end it carries an internally threaded aperture 46 for receiving the threaded member of another section or the screw 47 of the button 4. In this form I have shown a detachable U-shaped cover 48 which may be lifted, as shown, to expose the switching mechanism, but which, when lowered, is held in its lowered position by the floor board engaging with the top of the cover. The U-shaped support 49 supports the switching mechanism and forms the enclosure for the side walls of the resulting casing or cover formed by the cover 48 and support 49.

In Figure 9 it will be noted that the slots extend transversely completely across the supporting insulating plate 11.

Referring to Figures 10 and 11, it will be noted that the parts are similar and the operation is similar, as the parts operate in the other views, but the contact fingers are supported on the side walls 50. It is also possible by this arrangement to have a greater number of contact fingers if desired. This form eliminates the insulating supporting plate 11.

It will be understood that I desire to comprehend within my invention such modifications as may be necessary to adapt it to varying conditions and uses.

Having thus fully described my invention, what I claim as new and desire to secure by Letters Patent, is:—

In a lighting circuit, a source of current having a ground connection and a switch connection, a switch on said switch connection, a pair of current connections having terminals at each end thereof, a resistance coil connecting the terminals at one end of each of the current connections, said switch adapted to contact with either of the resistance terminals, a lamp having a ground connection and a switch connection, a switch adapted to contact with the switch connection and to either of the contacts on the other end of the pair of current connections, whereby operation of either switch will vary the intensity of the light from bright to dim or from dim to bright.

In testimony whereof, I affix my signature.

WILLIAM E. McLAUGHLIN.